Figure 1:
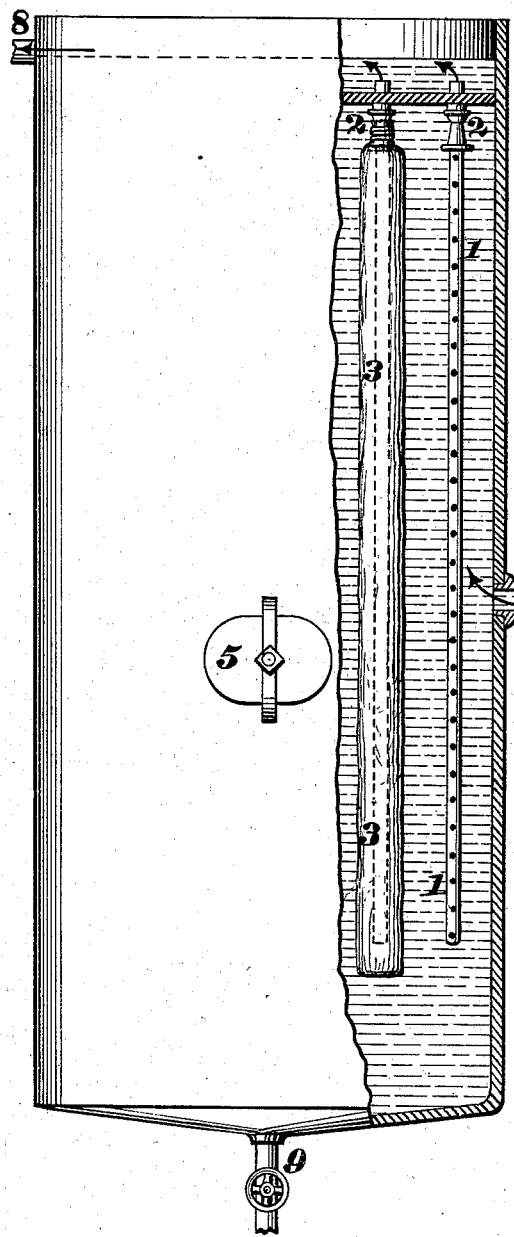

G. C. W. BELCHER.
Filtration of Sugar Solution.

No. 217,442. Patented July 15, 1879.

UNITED STATES PATENT OFFICE.

GEORGE C. W. BELCHER, OF ST. LOUIS, MISSOURI.

IMPROVEMENT IN FILTRATION OF SUGAR SOLUTIONS.

Specification forming part of Letters Patent No. 217,442, dated July 15, 1879; application filed December 23, 1878.

*To all whom it may concern:*

Be it known that I, GEORGE C. W. BELCHER, of St. Louis, Missouri, have invented certain Improvements in the Filtration of Sugar Solutions, of which the following is a specification.

My invention relates especially to the filtration of sugar solutions, commonly known as "sugar-liquors," though it is capable of use in the filtration of other liquids.

The apparatus now commonly in use for this purpose consists of a series of filtering-bags hung upon metallic bottles, and inclosed in external bags, commonly called "sheaths," of smaller diameter and coarser texture than the said filtering-bags, and open at the bottom. These bags, thus inclosed in their sheaths, are suspended in cases, usually several hundred in a single case, several thousand being required for daily use in a refinery of average size. The sugar-liquor enters these filtering-bags through their respective bottles, which are screwed directly or indirectly into the top of the case. All feculent matter removed by this filtration is necessarily retained within the bags, which speedily become clogged. The weight of the liquor will no longer force it through them, and additional pressure cannot be applied without danger of breaking them. They must, therefore, be cleaned. For this purpose they must be removed from the bottles by which they are suspended, washed, and wrung. They are of such shape as to render it impracticable to turn them wrong-side out while the feculent matter is still in them, and often have to pass through a series of washings and wringings before they are again ready for use.

The weight of the sugar-liquor is such as to occasion frequent breakage of these bags and their respective sheaths while in use, especially when they have begun to clog. The expense involved in the replacement of the bags and sheaths thus broken is very considerable, amounting to several thousand dollars a year in refineries of average size; but the results of this breakage are in other ways still more serious. The feculent matter which has accumulated in the bags is carried at once into the reservoir of filtered liquor, and the unfiltered liquor continues to flow through the broken bag until the break is discovered and its course stopped. As it is impracticable to constantly watch all the bags in use, this flow will often continue for some time. In any event the alternative is presented of passing on the liquor to succeeding stages with the feculences thus discharged still in it, or refiltering the entire body of liquor with which these feculences have been remixed.

The objections to this method of filtration are, first, the labor and expense involved in the frequent removal and cleansing of the bags, the interruption in their use, and incident wear and tear; second, the loss of bags and sheaths by breakage from over-pressure; third, the injury to the liquor or expense of refiltration caused by the discharge of feculent matter and ulfiltered liquor; fourth, the large number of bags required for use.

The purpose of my invention is to remedy these several objections.

For this purpose I construct a cylinder, preferably of boiler-iron, of sufficient strength to resist considerable artificial internal pressure. I suspend the filtering-bags by their bottles within this cylinder, and insert within each of these bags a perforated metallic tube, preferably of brass or copper, closed at the bottom, or nearly so, open at the top, and firmly secured in the top of the aforesaid cylinder.

The construction and arrangement are more fully shown by reference to the accompanying drawings, in which—

Figure 1 shows the above-mentioned cylinder having a portion removed, as indicated by the broken line, to show the internal arrangement.

The above-mentioned perforated tubes are shown as 1 1, Fig. 1. The filtering-bag is omitted from one of the tubes here shown, in order to exhibit it more fully. One of the filtering-bags arranged in position for use is shown as 3, Fig. 1, the perforated tube within it being shown by dotted lines.

As a precaution against breakage, the bag is made longer than the tube, as shown in the drawings. The pipe for the admission of the sugar-liquor to this cylinder is shown as 4, and a man-head as 5.

Figure 2:
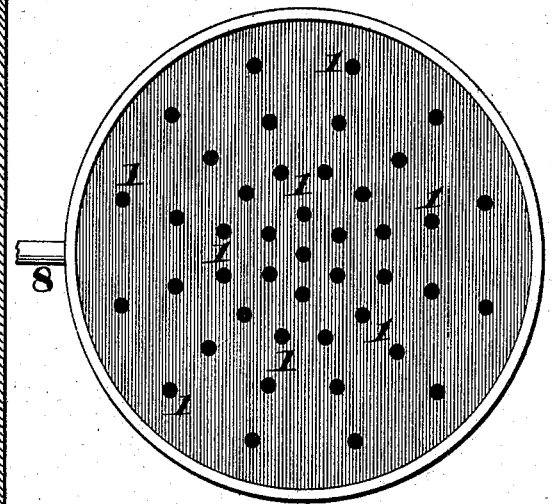
Figures 3, 4:
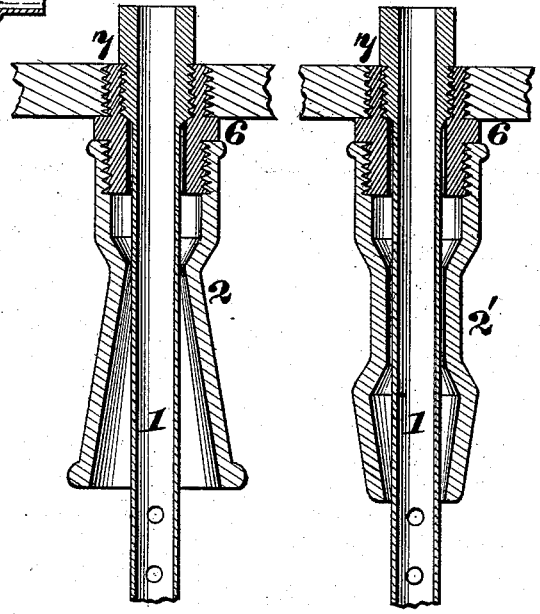

Fig. 2 is a top view of the cylinder, showing the ends of tubes 1 1. Fig. 3 shows, on a larger scale, a cross-section of the upper portion of the tube 1 as arranged in the bottle 2. Fig. 4 shows an improved form of bottle which may be substituted for bottle 2, Fig. 3.

The operation is as follows: The sugar-liquor enters the cylinder A, under pressure, through pipe 4, and is forced by this pressure through the filtering-bags, which are sustained against the pressure by their internal metallic tubes 1 1. The filtered liquor passes out through the tops of these tubes, and thence through pipe 8, or by any other convenient communication, to its reservoir.

The pressure upon the liquor in cylinder A may be obtained by any of the known methods. I prefer a force-pump or other power capable of being regulated at the will of the operator, according to the quality or condition of the liquor; but a head obtained from an elevated reservoir may be used.

The use of the pressure-resisting cylinder A and supporting-tubes 1 1 thus enables me to force the liquor rapidly through the filtering-bags without danger of breakage. It effects a great saving in bags, dispenses entirely with the sheaths, and avoids the mischief resulting from the discharge of feculences into the reservoir for filtered liquor. The feculent matter removed by filtration is retained on the outside of the bag instead of within it, and is hence much easier of removal.

In order to wash the bags, I pass steam or streams of heated water into the tubes 1 1 through their top. They pass through the bags in the opposite direction from the sugar-liquor, and hence readily and rapidly remove any feculent matter that adheres to the exterior of the bag. The water may pass out of the cylinder A through the pipe 9, which also serves to draw off the unfiltered liquor and residuum when the filtration ceases. A large saving in time, labor, and expense of washing is thus effected.

The bottle for suspending the filtering-bags may be of the ordinary form, as shown in Fig. 3, and attached to the top of the cylinder by nipple 6, as seen in Fig. 3, permanently screwed into said top.

I attach, by solder or otherwise, to tubes 1 1, sleeves 7, (seen in Figs. 3 and 4,) cutting a thread around this sleeve, and a corresponding thread upon the inside of the nipple 6. By screwing this sleeve into the nipple 6, as shown in Fig. 3, the tube is firmly secured against pressure in either direction. I prefer a modification in the form of the bottle which better adapts it to the change in direction of pressure upon the bag. This modified form is shown in Fig. 5.

After swelling sufficiently to afford a support for the bag, the bottle is made to converge, as shown in said Fig. 4, thus presenting a surface less liable to tear the bag when forced against it by the external pressure employed in this method of filtration.

I have spoken of the external casings used by me in which the liquor is applied under pressure to the filtering-bags as pressure-cylinders, this being a convenient form in which to construct them; but it is obvious that their shape is not essential, and may be varied, if desired. So, also, they may be inverted or otherwise varied in position, though there are obvious advantages in having the discharge at the top. The tubes may also be varied in shape or formed of a series of bars, provided they continue to serve the purpose of sustaining the bags against the external pressure used in the operation, and at the same time allow the filtered liquor to escape through them.

Perforated tubes might be constructed of such dimensions as to embrace the filtering-bags, and the liquor be forced outward instead of inward; but this method is exposed to several objections as compared with that heretofore described. The positions of pipes for admitting and discharging the liquor, as shown in the drawings, may be varied at pleasure.

A coil or section of steam-pipe, such as is commonly used in the present style of bag-filter casings, may be also used in my pressure cylinder or casing for the purpose of warming either directly or indirectly the bags and the solutions contained within the bags, and thereby assisting the filtration of the liquor and the cleansing of the bags.

I am aware that it is not new to cleanse filters by a stream or current in reverse direction to that which has been filtered. A well-known instance is the mode of cleansing water-filters.

What I claim as my invention is—

1. The combination of a tight case, filtering-bags within the case secured to one head only and stopping short of the other, a re-enforcing tube having suitable interstices, and mechanism for supplying the liquor to be filtered under pressure, substantially as described.

2. The combination of a pressure-cylinder, filtering-bags secured to one head thereof and stopping short of the other, and perforated metallic re-enforcing tubes within the bags, substantially as described.

3. The combination of a tight case, filtering-bags within the case secured to one head and stopping short of the other, and mechanism for supplying the liquor to be filtered under pressure, substantially as described.

4. The combination of a tight casing, a series of independent filters suspended therein, mechanism for forcing the liquor to be filtered through the filters in one direction, and mechanism for passing the cleansing medium through the filters in the reverse direction, as and for the purpose set forth.

5. The combination of a pressure-casing, a series of independent filters in a common chamber therein, mechanism for forcing the liquor to be filtered into the chamber of the casing, through the filters, and out through their delivery-tubes, and mechanism for passing a cleansing medium in through the filters, out into the chamber of the casing, and through a suitable duct, disintegrating and carrying with it the sediment or feculæ previously deposited upon the outside of the filters, substantially as described.

6. The combination, with filtering-bags hung by one end only, of perforated re-enforcing-tubes secured at the end corresponding with the mouth of the bag and free at the other end, substantially as described.

7. The improved bottle for use in sugar-filters, formed with an outward bulge or swell for the support of the bag, and from thence converging inwardly and downwardly to the lower aperture, substantially as described.

8. The improved bottle having the bulge and inward convergence, in combination with the filtering-bag and re-enforcing-tube, substantially as and for the purpose described.

9. The combination of sleeved tube, nipple, and bottle with pressure-casing A, substantially as and for the purposes described.

10. The combination of sleeved tube, nipple, and bottle with the pressure-casing and the filtering-bag suspended therein, as set forth.

11. The herein-described method of cleansing the bags by forcing water through them in the opposite direction from that of the filtration, substantially as and for the purposes described.

GEORGE C. W. BELCHER.

Witnesses:
WILLIAM P. LONG,
ADOLPH C. HUTTZ.